(12) United States Patent
Hatano

(10) Patent No.: US 6,740,611 B2
(45) Date of Patent: May 25, 2004

(54) ALUMINA-BASED COMPOSITE SINTERED MATERIAL, WEAR RESISTANT MEMBER AND A METHOD OF MANUFACTURING ALUMINA BASED COMPOSITE SINTERED MATERIAL

(75) Inventor: Yuki Hatano, Aichi (JP)

(73) Assignee: NGK Spark Plug Co., Ltd., Aichi (JP)

( * ) Notice: Subject to any disclaimer, the term of this patent is extended or adjusted under 35 U.S.C. 154(b) by 106 days.

(21) Appl. No.: 09/799,592

(22) Filed: Mar. 7, 2001

(65) Prior Publication Data

US 2001/0029230 A1 Oct. 11, 2001

(30) Foreign Application Priority Data

Mar. 8, 2000 (JP) ......................................... 2000-063623

(51) Int. Cl.$^7$ ........................ C04B 35/117; C04B 35/56
(52) U.S. Cl. ........................ 501/87; 501/96.1; 501/127; 428/698; 407/119
(58) Field of Search ........................ 501/87, 96.1, 127; 428/698; 407/119

(56) References Cited

U.S. PATENT DOCUMENTS 5,275,981 A * 1/1994 Nishiyama et al. ........... 501/87

6,133,182 A * 10/2000 Sasaki et al. ................ 501/127
6,248,681 B1 * 6/2001 Kato ............................ 501/87

FOREIGN PATENT DOCUMENTS

| EP | 0 926 108 A1 | 6/1999 |
| JP | 04-289002 | 10/1992 |
| JP | 5-208304 | 8/1993 |
| JP | 9-104943 | 4/1997 |
| JP | 2720093 | 11/1997 |

OTHER PUBLICATIONS

Translation of Japanese document 5–208304, Aug. 20, 1993.*

* cited by examiner

Primary Examiner—Karl Group
(74) Attorney, Agent, or Firm—Sughrue Mion, PLLC

(57) ABSTRACT

An alumina-based composite sintered material comprising alumina as a main ingredient and containing one or more carbonitridation products of groups IVa, Va and VIa of the periodic table and/or two or more carbonitridation products of solid solutions of groups IVa, Va and VIa of the periodic table. The content of nitrogen solid solute in the carbonitridation product increases from the interior to the surface of the sintered material, and the Vickers hardness at the surface of the sintered material is 19.5 GPa or more.

11 Claims, 3 Drawing Sheets

Cut portion

ALUMINA-BASED COMPOSITE SINTERED MATERIAL, WEAR RESISTANT MEMBER AND A METHOD OF MANUFACTURING ALUMINA BASED COMPOSITE SINTERED MATERIAL

BACKGROUND OF THE INVENTION

1. Field of the Invention

This invention concerns an alumina-based composite sintered material which is a sintered material comprising alumina as a main ingredient and, more particularly, it relates to a wear resistant member such as a cutting tool having excellent wear resistance and chipping resistance, as well as a method of manufacturing an alumina-based composite sintered material.

2. Description of the Related Art

Heretofore, alumina-based composite sintered materials have been used generally as wear resistant members (wear resisting members) including cutting tools since they have excellent mechanical properties. Further, various improvements have been attempted in recent years by compounding with other ingredients for further improving performance.

For example, Japanese Patent Laid-Open No. 104943/1997 proposes a technique of compounding zirconia ($ZrO_2$), thereby suppressing development of cracks to increase toughness and improve the chipping resistance.

However, since zirconia has low hardness and poor heat thermal impact resistance, it is not yet satisfactory in view of wear resistance and heat resistance.

Further, Japanese Patent No. 2720093 proposes a technique of compounding titanium carbide (TiC) of high hardness with needle alumina ($Al_2O_3$) to increase toughness while keeping hardness to some extent, thereby improving the chipping resistance in addition to providing excellent wear resistance.

However, needle alumina not only is disadvantageous because it is expensive, but also tends to form gaps at its periphery such that incorporation of needle alumina can cause defects.

Further, since titanium carbide is less sinterable, the material has to be densified by sintering at high temperature or applying hot pressing. However, this results in a problem that the entire structure grows into coarse grains which lowers hardness and lacks wear resistance when sintered at high temperature, or the shape is restricted when sintered by hot pressing.

Further, a technique of re-sintering an HIP sintered material in an $N_2$ atmosphere to make a value $N/(C+N)$ maximum at the surface and decrease the value from the surface to the interior is disclosed in Japanese Patent Laid-Open No. 208304/1993. However, when the HIP sintered material is re-sintered, pores closed during the HIP process form open pores again and the structure at the surface tends to grow into coarse grains which lowers the strength. Further, since TiN has a lower hardness and tends to be poor in wear resistance compared with TiC, it is necessary to control the nitridation amount at the surface in order to maintain the wear resistance. However, the HIP sintered material is substantially densified such that control of the amount of $N_2$ introduced at the surface by re-sintering is extremely difficult.

SUMMARY OF THE INVENTIONS

This invention has been made in view of the foregoing problems of the prior art. Therefore, an object of the present invention is to reduce the defects of alumina-based composite sintered materials to obtain an alumina-based sintered material and a wear resistant member not only excellent in wear resistance but also excellent in chipping resistance, as well as a method of manufacturing an alumina-based composite sintered material.

Accordingly, the present invention provides an alumina-based composite sintered material comprising alumina as a main ingredient and containing one or more carbonitridation products of groups IVa, Va and VIa of the periodic table and/or carbonitridation products of two or more solid solutions of groups IVa, Va and VIa of the periodic table, wherein the content of nitrogen solid solute in the carbonitridation product increases from the interior to the surface of the sintered material, and the Vickers hardness at the surface of the sintered material is 19.5 GPa or more.

It is considered, for example, as shown in FIG. 1(a) of the accompanying drawings, that titanium carbide (TiC) grains intrude between alumina grains in the alumina-based composite sintered material according to this invention. Nitrogen (N) is dissolved as a solid solute in titanium carbide to form a solid solution (Ti(C, N)) of a carbonitridation product. The content of nitrogen solid solute in titanium carbide is expressed by the size of the annulus around the central circle representing TiC.

As can also be seen from FIG. 1(a), the content of nitrogen solid solute in the carbide increases from the interior to the surface of the sintered material. On the other hand, in the existent product shown in FIG. 1(b), the content of nitrogen solid solute in the carbide is substantially identical between the interior and the surface of the sintered material.

As described above, since the content of nitrogen solid solute in the carbonitridation product increases from the interior to the surface of the sintered material, that is, the content of nitrogen solid solute in the carbonitridation product is greater in the surface than in the interior of the sintered material in this invention, sinterability is high to enable densification at a low temperature. Therefore, a sintered material of high hardness and high strength having a fine structure, that is, an alumina-based composite sintered material having excellent wear resistance and chipping resistance, is obtained.

Further, since the Vickers hardness at the surface of the sintered material is 19.5 GPa or more due to the distribution and content of nitrogen solid solute described above, this invention can provide sufficient wear resistance, for example, as wear resistant cutting tools.

The alumina-based composite sintered material referred to herein is a sintered material comprising alumina as a main ingredient (for example, 60% by weight or more), compounded with the addition of other ingredients. Further, the load used for measuring the Vickers hardness is 1.0 kgw.

One or more carbonitridation products of groups IVa, Va and VIa of the periodic table can include, for example, Ti(C, N), Zr(C, N) for group IVa, V(C, N), Nb(C, N), Ta(C, N) for group Va and VIa $Cr_3$(C, N) for group VIa.

Further, at least two carbonitridation products of solid solutions of groups IVa, Va and VIa of the periodic table can include, for example, (Ti, W)(C, N) and (W, Ta, Nb)(C, N).

The alumina-based composite sintered material according to this invention contains at least one carbonitridation product of groups IVa, Va and VIa of the periodic table and/or at least two carbonitridation products of solid solutions of groups IVa, Va and VIa of the periodic table, and it may contain both carbonitridation products.

Preferably the element belonging to groups IVa, Va and VIa of the periodic table is one or more of Ti, V and Zr.

This exemplifies metal elements contained in carbonitridation products of solid solutions of groups IVa, Va and VIa of the periodic table.

By using metal elements, an alumina-based composite sintered material having excellent properties described above can be obtained.

One or more carbonitridation products of Ti, V and Zr can include, for example, Ti(C, N), V(C, N) and Zr(C, N). Further, two or more carbonitridation products of solid solutions of Ti, V and Zr can include, for example, (Ti, V)(C, N) and (Ti, Zr)(C, N).

Preferably, the content of the carbonitridation product in the alumina-based sintered material is 10 to 40% by weight.

The content of the carbonitridation product (based on the entire sintered material) is defined as 10 to 40% by weight. This is because particles of alumina as the main ingredient do not grow into coarse grains and do not lower the strength and the hardness of the sintered material when the content of the carbonitridation product is 10% by weight or more. Also, the sinterability is not lowered and densification at low temperature where the entire structure becomes fine is possible when the content of the carbonitridation product is 40% by weight or less.

Then, a more preferred effect is obtained within a range of 25 to 35% by weight.

The carbonitridation product comprises one or more carbonitridation product(s) of groups IVa, Va and VIa of the periodic table and/or two or more carbonitridation products of solid solutions of groups IVa, Va and VIa of the periodic table.

Preferably the content of nitrogen solid solute in the carbonitridation product is 40 atom % (at %) or less. The value of the nitrogen content in at % represents the proportion of carbon atoms that have been substituted by nitrogen atoms.

The content of nitrogen solid solute in the carbonitridation product is defined as 40 at % or less (naturally exceeding 0 at %), because the hardness of the carbonitridation product is not lowered and lowering of strength and hardness by the promotion of grain growth of the main ingredient alumina can be prevented to suppress growth into coarse grains at an amount of 40 at % or less.

Then, a more preferred effect is obtained within a range of 20 to 30 at %.

The effect by specifying the content of nitrogen solid solute is remarkably obtained at the surface of the alumina-based composite sintered material in contact with a workpiece, for example, in the case of using a cutting tool.

The carbonitridation product includes one or more carbonitridation products of groups IVa, Va and Via of the periodic table and/or two or more carbonitridation products of solid solutions of groups IVa, Va and Via of the periodic table.

Preferably a hard layer, formed by coating with a hard material, is provided on the surface of the sintered material.

TiC, TiN, TiCN and/or $Al_2O_3$ can be used as the hard material, for instance, to thereby further improve the wear resistance.

As the coating method, PVD (Physical Evaporation Deposition method) or CVD (Chemical Vapor Deposition method) can be used, for instance.

The invention further provides a wear resistant member comprising an alumina-based composite sintered material as defined above.

The wear resistant member according to this invention is composed of an alumina-based composite sintered material described above. Accordingly, it has excellent wear resistance and chipping resistance.

The invention further provides that the wear resistant member comprising the wear resistant material can be a cutting tool.

Accordingly, the cutting tool has excellent wear resistance and chipping resistance.

The wear resistant member can include, in addition to the cutting tool, for example, bearings, dies, press molds, chain saw blades and sliding members of engines.

According to another aspect, the invention provides a method of manufacturing an alumina-based composite sintered material comprising alumina as a main ingredient, wherein nitrogen is dissolved as a solid solute in carbides to form carbonitridation products in a powder molded product formed by compounding one or more carbides of groups IVa, Va and VIa of the periodic table with alumina as a main ingredient, while controlling an $Ar/N_2$ gas mixing ratio and a temperature elevating rate upon sintering, whereby the content of nitrogen solid solute in the carbonitridation product is increased from the interior to the outside of the sintered material.

According to this invention, sinterability can be improved and the material can be densified at low temperature by further increasing the content of nitrogen solid solute near the surface of the sintered material while maintaining hardness by nitriding the surface of the starting carbide material. This can provide a sintered material of high hardness and high strength having a fine structure.

Accordingly, when used as the wear resistant member, excellent wear resistance and chipping resistance can be obtained.

An HIP (Hot Isostatic Pressing) treatment may optionally be applied for increasing density.

The present invention is based on the following findings. An $Ar/N_2$ gas mixing ratio and a temperature elevation rate are defined within specified ranges upon sintering of a powder molded product comprising alumina as a main ingredient, compounded with carbides of groups IVa, Va and VIa of the periodic table. This dissolves nitrogen as a solid solute into the carbides to form carbonitridation products and increases the content of nitrogen solid solute in the carbonitridation product from the interior to the surface of the sintered material. It is considered that grain boundary diffusion of alumina and carbide is promoted as the content of nitrogen solid solute increases. Since this improves the sinterability to enable densification at low temperature, it is possible to obtain a sintered material of high hardness and high strength having a fine structure.

More specifically, by nitriding the surface of the starting carbide material, a sintered material of high hardness and high strength having a fine structure is obtained by further improving the sinterability to increase the density near the surface of the sintered material while maintaining the hardness of the starting carbide material. When used as a wear resistant member, excellent wear resistance and chipping resistance can be achieved.

BRIEF DESCRIPTION OF THE DRAWINGS

FIG. 2 shows a cutting tool in which

DESCRIPTION OF THE PREFERRED EMBODIMENTS

Now, examples for the mode of practicing an alumina-based composite sintered material and a wear resistant member, as well as a method of manufacturing an alumina-based composite sintered material according to this invention are to be explained below. However, the present invention should not be construed as being limited thereto.

EXAMPLE (a) Firstly, a cutting tool composed of an alumina-based composite sintered material of this example will be described.

Figure 1A:
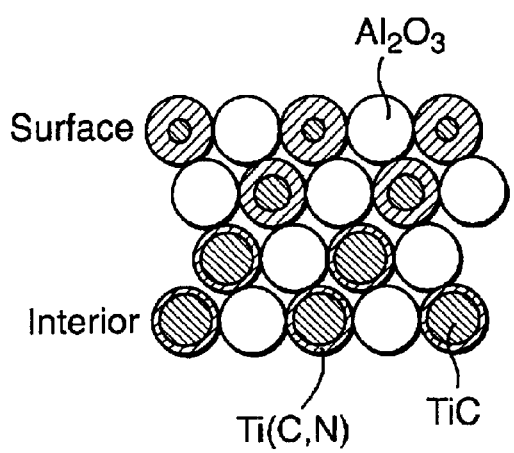
FIG. 1 schematically shows the structure of a sintered material in which FIG. 1(*a*) is an explanatory view showing an example of a product of this invention and FIG. 1(*b*) is an explanatory view showing an example of an existent product.
Figure 1B:
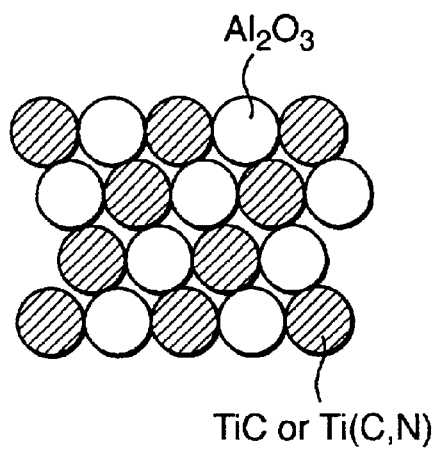
Figure 2A:
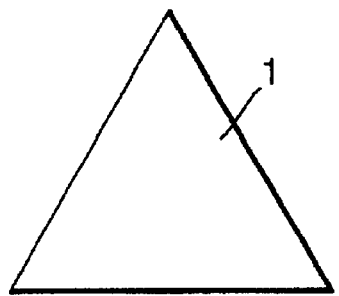
FIG. 2(a) is a plan view and FIG. 2(b) is a front elevational view.
Figure 2B:
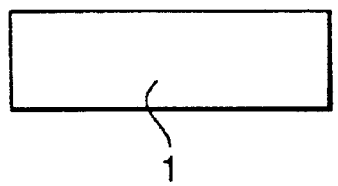

As shown in FIG. 2, a cutting tool 1 of this example has a substantially trigonal plate-like shape (for example, a TNGN 333 shape according to JIS B4121 (1985)), which is a so-called ceramics chip attached to the top end of a holder.

The cutting tool 1 is composed of an alumina-based composite sintered material formed by sintering a material comprising alumina ($Al_2O_3$) as a main ingredient with addition of other ingredients in order to improve, for example, wear resistance or sinterability.

Other ingredients to be compounded with alumina can include at least one carbonitridation product of groups IVa, Va and VIa of the periodic table (for example, carbonitridation product of Ti, V, Zr) or at least two carbonitridation products of solid solutions of groups IVa, Va and VIa of the periodic table (for example, carbonitridation products of solid solutions of Ti, V and Zr). Alternatively, both of the above carbonitridation products can be compounded with alumina.

Particularly, in this example, the content of nitrogen solid solute in the carbonitridation product increases in the alumina-based composite sintered material from the interior to the surface of the sintered material and, further, the surface of the sintered material has a high Vickers hardness of 19.5 GPa or more.

Further, in a more preferred embodiment of the example, the content of the carbonitridation product of groups IVa, Va and VIa of the periodic table is within a range from 10 to 40% by weight and, further, the content of nitrogen solid solute in the carbonitridation product of groups IVa, Va and VIa of the periodic table is 40 at % or less.

For improving the wear resistance or the like on the surface of the cutting tool 1, a hard layer made of a hard material such as TiC may be disposed thereon.

(b) Next, an alumina-based composite sintered material and manufacturing method of a cutting tool 1 constituted therewith will be described.

At first, a starting material was formulated by adding carbides to be compounded at the ratio shown in the following Table 1 (Table for the formulated composition) to commercially available starting alumina material, and the material is mixed and pulverized by an attritor using acetone as a medium and formed into a slurry.

TABLE 1

Composition example Composite hard carbide (wt %) Balance ($Al_2O_3$)

| Composition example | Composite hard carbide (wt %) Balance ($Al_2O_3$) |
|---|---|
| A | TiC 5 |
| B | TiC 10 |
| C | TiC 20 |
| D | TiC 40 |
| E | TiC 50 |
| F | TiC 25, TaC 10 |
| G | TiC 25, ZrC 10 |
| H | TiC 25, WC 10 |
| I | $TiC_{0.3}N_{0.7}$ 20, TaC 10 |
| J | $TiC_{0.5}N_{0.5}$ 20, TaC 10 |

Then, the slurry was dried and a binder, for example, paraffin was added to the resultant powder mixture, which was subjected to one-axis pressing to obtain a molded product (molded product of a trigonal plate shape).

Then, the resultant molded product, after a binder removing treatment in vacuum at 800° C., was preliminarily sintered in an Ar/$N_2$ mixed gas stream at 1600–1700° C. to an extent such that the surface was densified.

Then, an HIP treatment was applied to the preliminarily sintered product in an atmosphere of Ar gas at a pressure of 130 to 160 MPa at a sintering temperature of 1450 to 1500° C. to prepare an alumina-based composite sintered material substantially of the shape shown in FIG. 2.

Accordingly, by grinding the surface of the alumina-based composite sintered material entirely by about 0.2 mm, a cutting tool 1 of the shape shown in FIG. 2 was obtained.

Further, in the same manner, a sintered material and cutting tools of the comparative examples were also manufactured.

In Table 2, specimens Nos. 2–4, 8, 9, 11, 13–15 and 17–19 are examples within the scope of this invention and others are comparative examples outside of the scope of this invention. Further, a TiN coating was applied to specimen No. 14 by PVD on the surface of the alumina-based composite sintered material.

(c) Next, experimental examples of the alumina-based composite sintered material and the cutting tool obtained by the above manufacturing method are described.

1. The content of nitrogen solid solute in Ti(C, N) as typical examples for those of groups IVa, Va and VIa of the periodic table was measured by XPS (X-ray Photoelectron Spectroscopy) of the alumina-based composite sintered materials of specimens Nos. 1–21 both for the surface and the interior. The results are shown in the following Table 2.

The measuring position at the interior was at a depth of 2.5 mm from the surface along the direction of the plate thickness in the axial center of a sintered material of a trigonal columnar shape.

2. Further, the content of nitrogen solid solute in Ti(C, N) was measured by XPS of sample Nos. 1–21 of alumina-based composite sintered materials from the surface to the interior. The results are shown together with the distance from the surface in FIG. 3.

3. Further, the Vickers hardness Hv at the surface of the sintered materials was measured under a load of 1.0 kgw. The results are also shown in the following Table 2.

4. Further, a cutting test was conducted under the following conditions by using a cutting tool prepared by grinding the surface of the sintered material by about 0.2 mm into a TNGN 333 shape.

Cutting Condition

| Work to be cut: | JIS G4105 (1979) |
|---|---|
| Cutting speed V: | 250 m/min |
| Feed speed f: | 0.16 mm/rev |
| Notch d: | 0.2 mm |
| Dry/wet: | DRY |

Figure 4:
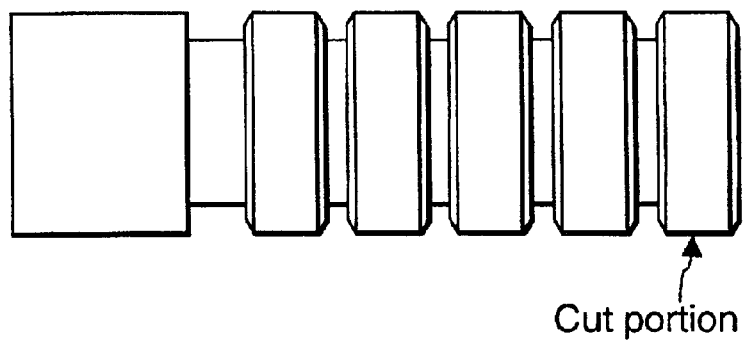
FIG. 4 is a plan view showing a work to be cut.

In the cutting test, a circular columnar portion, as shown in FIG. 4, having grooves of predetermined width (6 mm) and depth (7 mm) with interval (22 mm) was cut. The cutting life was determined when the wear amount the relief surface of the cutting tool reached 0.05 mm or more, or when chipping occurred.

The results are also shown in the following Table 2 and FIG. 5.

Figure 5:
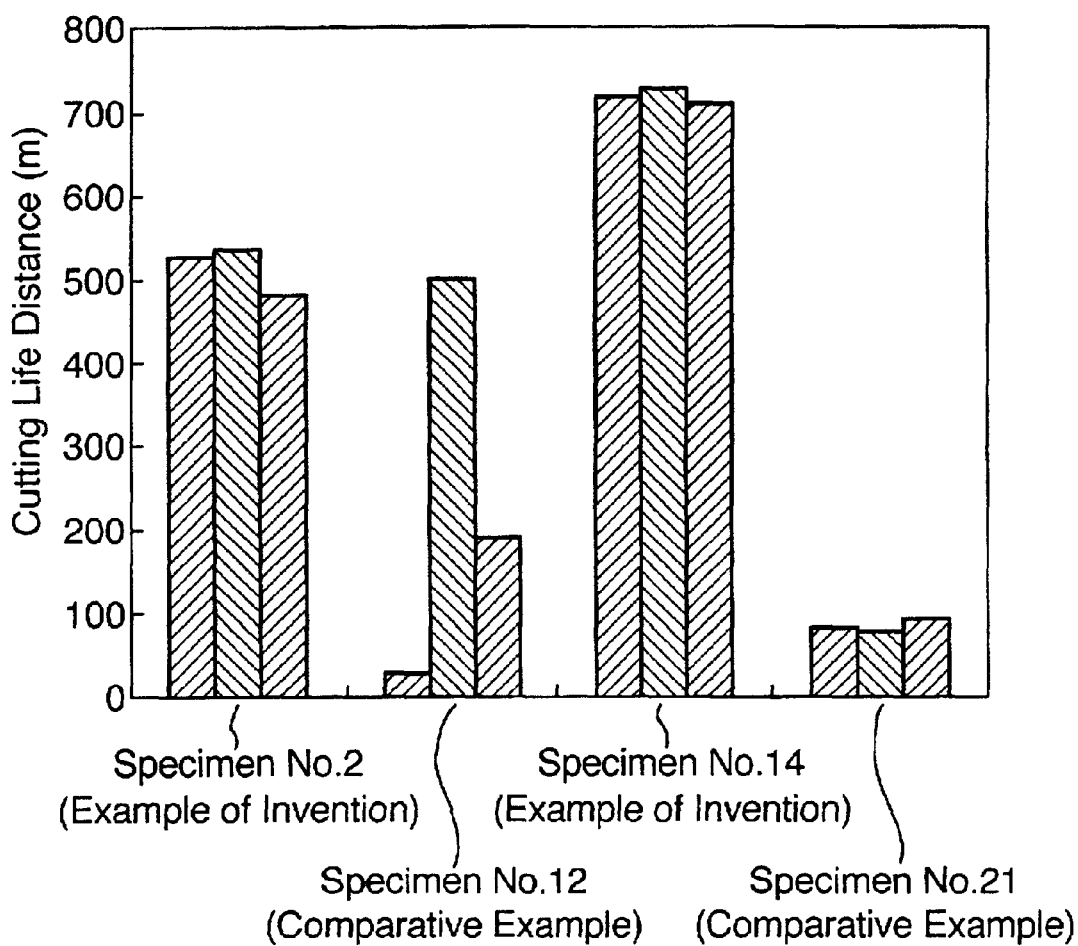
FIG. 5 is a graph showing the results of a cutting test.

Particularly, specimen No. 14 having a hard layer formed by coating a hard material on the surface of the sintered material had the longest working distance of 715 m and most excellent wear resistance as shown in FIG. 5.

On the contrary, since the comparative examples do not satisfy both of the conditions for the change of the content of nitrogen in solid solution and Vickers hardness, the working distance was as short as 144 mm or less and the wear resistance was not sufficient. Particularly, those with the content of nitrogen solid solute at the surface of the sintered materials exceeding 40 at % had low wear resistance. Further, some of comparative examples resulted in chipping in the course of working (specimen No. 5) or unstable life (specimen No. 12) and were not satisfactory also in view of strength.

This invention is not restricted to the examples described above and it will be apparent that it can be practiced in various modes within a range not departing from the scope of the invention.

For example, while the cutting tool is mentioned as an example of the wear resistance member in the examples, the

TABLE 2

| Specimen No. | | Formulated composition | Sintering temp. (° C.) | Ar/N$_2$ gas mixing ratio | Temperature elevation rate ° C./min | Content of N solid solute in TiC (at %) | | Hv at surface used (GPa) | Working distance until end of cutting life (m) |
|---|---|---|---|---|---|---|---|---|---|
| | | | | | | Surface | Interior | | |
| Comparison | 1 | A | 1650 | 10/0.5 | 5 | 31 | 13 | 17.5 | 123 |
| Invention | 2 | B | ↑ | ↑ | ↑ | 37 | 16 | 19.8 | 513 |
| | 3 | C | ↑ | ↑ | ↑ | 34 | 16 | 20.5 | 492 |
| | 4 | D | ↑ | ↑ | ↑ | 38 | 17 | 19.6 | 451 |
| Comparison | 5 | E | ↑ | ↑ | ↑ | 38 | 14 | 18.0 | instant chipping |
| | 6 | C | ↑ | 10/10 | ↑ | 98 | 98 | 16.4 | 103 |
| | 7 | C | 1700 | 10/5 | ↑ | 73 | 70 | 17.6 | 144 |
| Invention | 8 | C | ↑ | 10/1 | ↑ | 32 | 17 | 20.0 | 431 |
| | 9 | C | ↑ | 10/0.5 | ↑ | 2 | 0 | 21.0 | 431 |
| Comparison | 10 | C | ↑ | 10/1 | 1 | 82 | 83 | 18.4 | 103 |
| Invention | 11 | C | ↑ | 10/1 | 10 | 14 | 2 | 20.3 | 595 |
| Comparison | 12 | C | ↑ | ↑ | 20 | 21 | 3 | 18.5 | life unstable |
| Invention | 13 | F | ↑ | ↑ | 5 | 25 | 16 | 21.2 | 656 |
| | 14 | F | ↑ | ↑ | ↑ | 25 | 16 | 21.2 | 718 |
| | 15 | H | ↑ | ↑ | ↑ | 22 | 17 | 20.8 | 595 |
| Comparison | 16 | J | ↑ | ↑ | ↑ | 84 | 78 | 17.7 | 103 |
| Invention | 17 | C | ↑ | ↑ | 3 | 28 | 21 | 20.0 | 574 |
| | 18 | G | ↑ | ↑ | ↑ | 27 | 22 | 21.0 | 595 |
| | 19 | H | ↑ | ↑ | ↑ | 28 | 23 | 20.6 | 554 |
| Comparison | 20 | I | ↑ | ↑ | ↑ | 94 | 91 | 17.4 | 41 |
| | 21 | J | ↑ | ↑ | ↑ | 98 | 77 | 18.3 | 82 |

Figure 3:
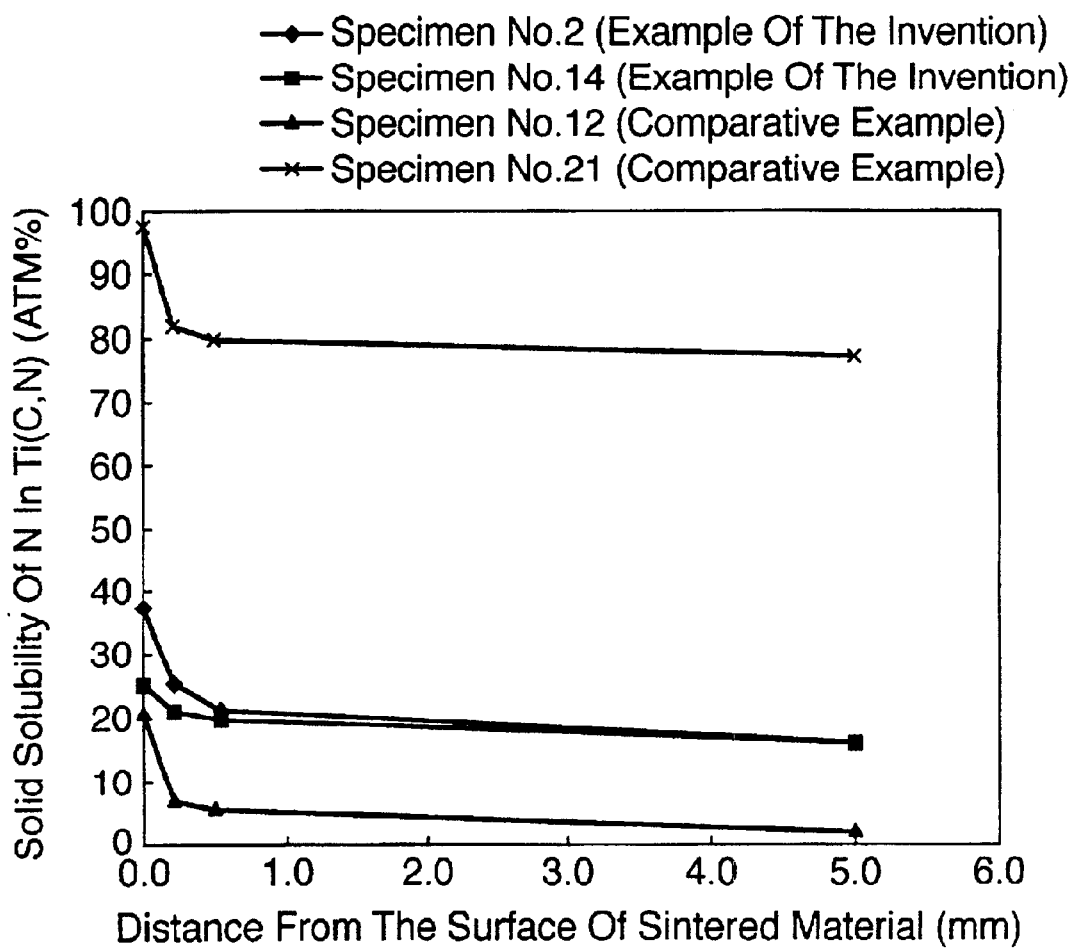
FIG. 3 is a graph showing the results of analysis by XPS of the content of nitrogen solid solute.

(d) As is apparent from Table 2, in the alumina-based composite sintered materials within the scope of this invention (specimen Nos. 2–4, 8, 9, 11, 13–15, 17–19), the content of nitrogen solid solute in Ti(C, N) is greater at the surface than in the interior of the sintered material (for example, gradually increases toward the surface as shown in FIG. 3) and the Vickers hardness on the surface of the sintered material is 19 MPa or more.

Accordingly, since the cutting tools of the examples according to this invention have excellent wear resistance, the cutting distance and working life are long. In addition, since they have high strength, chipping occurs less upon cutting, which is favorable.

Further, in the examples of this invention, B, C, D, F, G and H are used as the formulated compositions, and the content of carbonitridation products of groups IVa, Va and VIa of the periodic table is 10 to 40% by weight. Further, in the examples of this invention, the content of nitrogen solid solute in the carbonitridation product of groups IVa, Va and VIa of the periodic table is 40 at % or less.

alumina-based composite sintered material of this invention is not restricted to such cutting tools but is also useful, for example, as various kinds of wear resistant members such as bearings, dies, press dies, chain saw blades and sliding members of engines. Furthermore, in addition to the wear resistance member, it is useful, for example, in applications requiring structural materials at high temperature.

As described above specifically, the composite sintered material of this invention provides high hardness and strength compared with existent alumina-based composite sintered materials and, when used as wear resistant members, such as cutting tools, provides excellent wear resistance and chipping resistance and remarkably extended life.

This application is based on Japanese Patent Application No. 2000-63623 filed Mar. 8, 2000, the disclosure of which is incorporated herein by reference in its entirety.

What is claimed is:

1. An alumina-based composite sintered material comprising alumina grains as a main ingredient and containing at least one carbonitridation product of at least one element of groups IVa, Va and VIa of the periodic table and/or at least one carbonitridation product comprising a solid solution of two or more elements of groups IVa, Va and VIa of the periodic table, said carbonitridation product comprising grains interposed between said alumina grains having a nucleus made of a carbide of at least one element of groups IVa, Va and VIa of the periodic table, said sintered material having an interior including a center and a surface,
  wherein the carbonitridation product has a content of nitrogen solid solute that increases from the interior to the surface of the sintered material, and the Vickers hardness at the surface of the sintered material is 19.5 GPa or more.

2. The alumina-based composite sintered material as claimed in claim 1, wherein the element of groups IVa, Va and VIa of the periodic table is selected from the group consisting of Ti, V and Zr.

3. The alumina-based composite sintered material as claimed in claim 1, wherein the content of the carbonitridation product in the alumina-based sintered material is 10 to 40% by weight.

4. The alumina-based composite sintered material as claimed in claim 1, wherein the content of nitrogen solid solute in the carbonitridation product is 40 atom % or less.

5. The alumina-based composite sintered material as claimed in claim 1, further comprising a hard layer, formed by coating with a hard material, provided on the surface of the sintered material.

6. A wear resistant member comprising an alumina-based composite sintered material as claimed in claim 1.

7. The wear resistant member as claimed in claim 6, wherein the wear resistant member is a cutting tool.

8. A method of manufacturing an alumina-based composite sintered material comprising alumina grains as a main ingredient and containing at least one carbonitridation product of at least one element of groups IVa, Va and VIa of the periodic table and/or at least one carbonitridation product comprising a solid solution of two or more elements of groups IVa, Va and VIa of the periodic table, said carbonitridation product comprising grains interposed between said alumina grains having a nucleus made of a carbide of at least one element of groups IVa, Va and VIa of the periodic table, said sintered material having an interior including a center and a surface,
  wherein the carbonitridation product has a content of nitrogen solid solute that increases from the interior to the surface of the sintered material, and the Vickers hardness at the surface of the sintered material is 19.5 GPa or more, comprising the steps of:
  forming a powder molded product by compounding one or more carbides of at least one element of groups IVa, Va and Via of the periodic table with alumina as a main ingredient; and
  sintering said molded product at a temperature and in an atmosphere containing an $Ar/N_2$ gas, wherein said sintering comprises controlling the $Ar/N_2$ gas mixing ratio and temperature ramp rate so as to increase the content of nitrogen solid solute in the carbonitridation product from the interior to the surface of the sintered material.

9. The alumina-based composite sintered material as claimed in claim 4, wherein the carbonitridation product comprises nitrogen solid solute that covers titanium carbide located in the center of the carbonitridation product.

10. The alumina-based composite sintered material as claimed in claim 1, wherein the carbonitridation product comprises grains interposed between said alumina grains having a nucleus made of TiC and a surrounding annulus made of a solid solution of Ti (C, N).

11. The alumina-based composite sintered material as claimed in claim 1, wherein the carbonitridation product comprises grains interposed between said alumina grains having a nucleus made of a carbide of at least one element selected from the group consisting of Ti, V and Zr, and a surrounding annulus made of a nitrogen solid solute.

* * * * *